(12) United States Patent
Karwacki (10) Patent No.: US 12,310,337 B2
(45) Date of Patent: May 27, 2025

(54) METHOD RELATED TO THE OPERATION OF A FEED PUSHER AND A FEED PUSHER

(71) Applicant: DELAVAL HOLDING AB, Tumba (SE)

(72) Inventor: Szymon Karwacki, Tumba (SE)

(73) Assignee: DeLaval Holding AB, Tumba (SE)

( * ) Notice: Subject to any disclaimer, the term of this patent is extended or adjusted under 35 U.S.C. 154(b) by 252 days.

(21) Appl. No.: 17/638,257

(22) PCT Filed: Aug. 25, 2020

(86) PCT No.: PCT/SE2020/050819
§ 371 (c)(1),
(2) Date: Feb. 25, 2022

(87) PCT Pub. No.: WO2021/040605
PCT Pub. Date: Mar. 4, 2021

(65) Prior Publication Data
US 2022/0279754 A1 Sep. 8, 2022

(30) Foreign Application Priority Data
Aug. 26, 2019 (SE) .................................. 1950976-9

(51) Int. Cl.
*A01K 5/02* (2006.01)
(52) U.S. Cl.
CPC .......... *A01K 5/0258* (2013.01); *A01K 5/0275* (2013.01)
(58) Field of Classification Search
CPC ...... A01K 5/0258; A01K 5/0275; A01K 5/02; A01K 5/0291; A01K 1/105
See application file for complete search history.

(56) References Cited

U.S. PATENT DOCUMENTS

| 3,722,660 A | 3/1973 | Des |
| 5,559,716 A | 9/1996 | Gaalswyk |

(Continued)

FOREIGN PATENT DOCUMENTS

| DE | 202008015686 U1 * | 3/2009 | ............. A01K 1/105 |
| EP | 2 806 733 | 12/2014 | |
| EP | 3 017 692 | 5/2016 | |

(Continued)

OTHER PUBLICATIONS

International Search Report for PCT/SE2020/050819 mailed Oct. 21, 2020, 3 pages.

(Continued)

*Primary Examiner* — Peter M Poon
*Assistant Examiner* — Hae Rie Jessica Byun
(74) *Attorney, Agent, or Firm* — NIXON & VANDERHYE (57) ABSTRACT

A feed pusher and a method related to an operation of the feed pusher configured to travel on a feeding table along a longitudinal axis of the feeding table at a distance from a feeding table edge and configured to push animal feed placed on the feeding table sidewards in relation to the longitudinal axis towards the feeding table edge by a rotational movement of a rotatable screw driven by an electric motor include obtaining a value of a parameter related to the electric motor during a time period of the operation of the feed pusher traveling on the feeding table, and estimating an amount of animal feed that has been pushed during the time period based on the obtained value of the parameter.

20 Claims, 3 Drawing Sheets

(56) References Cited

U.S. PATENT DOCUMENTS

| | | | |
|---|---|---|---|
| 7,530,327 B2* | 5/2009 | Voogd | A01K 5/0275 |
| | | | 119/51.02 |
| 9,723,809 B2* | 8/2017 | Pastoor | A01K 1/105 |
| 2005/0284381 A1* | 12/2005 | Bell | A01K 5/0283 |
| | | | 119/51.02 |
| 2009/0069968 A1* | 3/2009 | Van Den Berg | A01K 5/0266 |
| | | | 701/23 |
| 2015/0034014 A1 | 2/2015 | Van Kuilenburg | |

FOREIGN PATENT DOCUMENTS

| | | | |
|---|---|---|---|
| EP | 3 494 779 | 6/2019 | |
| FR | 2862489 A1 * | 5/2005 | ............. A01K 1/105 |
| NL | 8500407 A * | 9/1986 | ........... A01F 29/005 |
| WO | 2014/033275 | 3/2014 | |
| WO | WO-2014033275 A1 * | 3/2014 | ............. A01K 1/105 |
| WO | WO-2014044629 A1 * | 3/2014 | ............. A01K 1/105 |
| WO | 2015/065172 | 5/2015 | |
| WO | 2018/038602 | 3/2018 | |
| WO | WO-2018038602 A1 * | 3/2018 | ............. A01K 1/105 |

OTHER PUBLICATIONS

Written Opinion of the ISA for PCT/SE2020/050819 mailed Oct. 21, 2020, 9 pages.
Search Report for SE1950976-9 mailed Mar. 6, 2020, 3 pages.
[Online] "Increasing feed intake has never been easier", Lely, retrieved on Feb. 17, 2020, 5 pages.
[Online], "DeLaval Introduces its New Robotic Feed Pusher, the DeLaval OptiDuo?", DeLaval, retrieved on Feb. 17, 2020, 4 pages.

* cited by examiner

METHOD RELATED TO THE OPERATION OF A FEED PUSHER AND A FEED PUSHER

This application is the U.S. national phase of International Application No. PCT/SE2020/050819 filed Aug. 25, 2020 which designated the U.S. and claims priority to SE 1950976-9 filed Aug. 26, 2019, the entire contents of each of which are hereby incorporated by reference.

BACKGROUND OF THE INVENTION AND PRIOR ART

The present invention relates to processing of animal feed on a feeding table.

In farms, such as cattle and/or dairy farms, animals will be fed by dispensing animal feed onto a feeding table in front of a feed fence. As the animals are eating, the amount of animal feed is reduced. At some point the remaining animal feed will be out of reach for the animals, and needs to be displaced, e.g. pushed, towards the fence within reach of the animals, and at some point, new animal feed need to be prepared. Thus, animal feed need to be attended to several times per day, which is time consuming. In recent years, especially in a larger size animal husbandry, it has been proven that it is favorable to move the animal feed closer to the animals by means of automatic feed displacers. By using automatic feed displacers a lot of time can be saved for a farmer who may focus on other work on the farm while the automatic feed displacer is processing the animal feed on the feeding table.

During the time automatic feeding systems have been used, efforts have been made to improve the feeding systems considering, inter alia, the operation of the systems. WO2014033275A1 is an example of a system for moving of animal feed by means of a screw operated feed pusher. Although, the system and the feed pusher described in the WO2014033275A1 work well, there is a desire to provide an improved method related to the operation of a feed pusher. Further there is a desire to provide an improved feed pusher for animal feed.

SUMMARY OF THE INVENTION

The object of the present invention is to provide an improved method related to the operation of a feed pusher considering inter alia the reliability of the process of estimating of the amount of animal feed on a feeding table. Further, the object of the present invention is to provide an improved feed pusher for animal feed.

The object is achieved by the method defined in claim 1 and by the feed pusher defined in claim 11.

Thus, the above mentioned object is achieved by a method related to the operation of a feed pusher being arranged to travel on a feeding table along a longitudinal axis of the feeding table at a distance from a feeding table edge and to push animal feed placed on the feeding table sidewards in relation to the longitudinal axis towards the feeding table edge by a rotational movement of a rotatable screw driven by an electric motor. The method comprises the steps of: obtaining a value of a parameter related to the electric motor during a time period of the operation of the feed pusher and estimating an amount of animal feed that has been pushed during the time period based on the obtained value of the parameter.

The operation of the electric motor can be described by a parameter related to the electric motor. Thus, by obtaining a value of a parameter related to the electric motor the conditions of the electric motor can be monitored. The rotatable screw, driven by the electric motor, generates some braking forces on the electric motor. However, the braking forces are mostly related to the amount of animal feed that is pushed by the rotatable screw. The braking forces increase when the pushed amount of animal feed increases, and the braking forces decrease when the pushed amount of animal feed decreases. Thereby, the value of the parameter related to the electric motor is correlated with the amount of animal feed that is pushed by the rotatable screw. Consequently, the amount of animal feed that has been pushed during a time period can be estimated based on the obtained value of the parameter during the time period.

Obtaining the value of the parameter related to the electric motor can be achieved in a simple manner by using a measuring or sensing device configured to measure or to sense the parameter. Thus, the amount of the animal feed that has been pushed during the time period can be estimated in a simple and reliable manner without need of complicated equipment.

Thereby, the above mentioned object is achieved.

According to an embodiment, the method comprises: predicting the remaining amount of animal feed on the feeding table along at least a part of the length of the feeding table based on the estimated amount of animal feed that has been pushed during the time period. Thereby, information about the estimated amount of animal feed that has been pushed during the time period can be used to predict, i.e. to forecast the amount of animal feed ahead of the feed pusher along at least the part of the length of the feeding table.

The prediction can be made based on a predefined algorithm using the estimated amount of animal feed that has been pushed during the time period. For example, it can be predicted that there is the same amount of animal feed along a predefined part of the feeding table ahead the feed pusher as the estimated amount of animal feed that has been pushed during the time period. The prediction may be based on further information about, for example, the kind and/or the size of the animals along the feeding table. Thus, by knowing the amount of animal feed that has been pushed during the time period and by knowing the kind and/or the size of the animals along a part of the feeding table it may be predicted how much animal feed remains at said part of the feeding table. For example, the amount of the animal feed, along the part of the feeding table where the same kind of animals are eating and/or where animals with approximately the same size are eating, corresponds to the amount of animal feed that has been pushed during the time period.

According to an embodiment, the method comprises predicting the total amount of animal feed remaining on the entire feeding table based on the estimated amount of animal feed and based on the distance from the feeding table edge.

The feeding table edge defines the side of the feeding table where animals eat from the feeding table.

The estimated amount of animal feed that has been pushed during the time period at a predetermined distance from the feeding table edge compared with a predetermined amount of animal feed at said predetermined distance from the feeding table edge can indicate the total amount of animal feed remaining on the entire feeding table. The prediction about the total amount of animal feed remaining on the entire feeding table can be done e.g. when the predetermined distance is an outermost distance or when the predetermined distance is a distance closest to the feeding table edge.

Thereby, an estimated amount of animal feed, which has been pushed during the time period, that is equal or above a first predetermined amount of animal feed at a first predetermined distance from the feeding table edge, can indicate a first total amount of animal feed remaining on the entire feeding table. For example, when the first predetermined distance is an outermost distance from the feeding table edge and when the first predetermined amount of animal feed has been set to a relatively large amount of animal feed, then the conclusion will be that the first total amount of animal feed on the entire feeding table is a relatively large amount of animal feed remaining on the entire feeding table. The relatively large amount of animal feed may mean that there is enough of animal feed on the entire feeding table for feeding animals.

In a similar way, the estimated amount of animal feed, that has been pushed during the time period, which is equal to or falls below a second predetermined amount of animal feed at a second predetermined distance from the feeding table edge, indicates a second total amount of animal feed remaining on the entire feeding table. Thus, when the second predetermined distance is a distance closest to the feeding table edge and when the second predetermined amount of animal feed has been set to a relatively low amount of animal feed, then the conclusion will be that the second total amount of animal feed remaining on the entire feeding table is a relatively low amount of animal feed on the entire feeding table. A detected low amount of animal feed close to the feeding table edge may mean that most of the animal feed on the entire feeding table has been eaten, and may advantageously be used as a trigger for preparing and/or providing of new feed.

According to an embodiment the parameter is correlated with the load of the electric motor. The load of the electric motor can be monitored by means of a sensor that may be arranged at the electric motor. Thus, the value of the parameter can be obtained in a reliable and efficient manner without need of equipment that stands out from the feed pusher.

According to an embodiment the parameter is correlated with the electric current through the electric motor. Measuring of an electric current through the electric motor gives information about how much energy the electric motor is using during operation of the feed pusher. Thus, the value of the parameter can be obtained in a reliable and efficient manner simply by monitoring the electric current through the electric motor.

According to an embodiment the method comprises measuring a travel distance the feed pusher has been traveled along the longitudinal axis of the feeding table. Thereby, also the travel distance can be used as a variable when estimating an amount of animal feed on the feeding table. Thereby, an improved method for estimating an amount of animal feed on a feeding table can be provided.

According to an embodiment the method comprises calculating a partial amount of animal feed present along the measured travel distance based on the estimated amount of animal feed that has been pushed during the time period and the measured travel distance. Thus, the partial amount of the total amount of animal feed along the feeding table can be calculated based on the estimated amount of animal feed and based on the measured travel distance, namely the amount present along the measured travel distance.

According to an embodiment the method comprises predicting a remaining amount of animal feed present on the remaining length of the feeding table ahead of the measured travel distance, based on the calculated partial amount of animal feed. The calculated partial amount of animal feed may be used to forecast the remaining amount of animal feed ahead of the measured travel distance. For example, it may be predicted that the remaining amount of animal feed ahead of the measured travel distance is the same as the calculated partial amount of animal feed. As a result, a yet improved method related to the operation of a feed pusher can be provided where also the remaining amount of animal feed present on the remaining length of the feeding table ahead of the measured travel distance can be predicted.

According to an embodiment the method comprises generating or updating a function representing the current amount of animal feed present on the feeding table based on at least one of the estimated amount of animal feed, the predicted remaining amount of animal feed, the predicted total amount of animal feed or the calculated partial amount of animal feed. The function representing the current amount of animal feed present on the feeding table may be used for visualization of the current amount of animal feed and/or for making decisions regarding feeding. The further processing and analysis may, for example, imply generating a map or a chart of the current amount of animal feed. Thus, making decisions regarding the feeding may be facilitated thanks to the generated function.

According to an embodiment the method comprises triggering the providing of information to an entity about the function. Thus, the information about the generated function can be provided to the entity, for example can be sent to the entity for further processing of the information about the function. The information can be sent through a wire or in a wireless manner. Thereby, the entity may be arranged at the feed pusher or the entity may be arranged at a distance from the feed pusher.

According to an embodiment the method comprises triggering the displaying on a user interface of a visual representation of the function. The visual representation of the function facilitates the understanding of the information for a user. Displaying the visual representation of the function on the user interface makes it easier for the user to interpret the information which improves the process of drawing the conclusions regarding an amount of animal feed on the feeding table and thus also regarding which actions, if any, that are to be taken.

According to an embodiment the method comprises triggering the sending of a message to an animal feed preparation and/or distribution apparatus when at least one of the estimated amount of animal feed, the predicted remaining amount of animal feed, the predicted total amount of animal feed or the calculated partial amount of animal feed is below a predetermined value of animal feed and when the distance is equal or shorter than a predetermined distance from the feeding table edge.

For example, the predetermined distance may be a distance closest to the feeding table edge. Thus, when the predicted total amount of animal feed is below a predetermined amount of animal feed and when the distance is the distance closest to the feeding table edge the conclusion will be that animal feed has been eaten on the entire feeding table and a refill of the animal feed along the entire feeding table may be needed.

In a similar way, a conclusion about refill of the animal feed at a position along the feeding table, may be drown, when at least one of the estimated amount of animal feed, the predicted remaining amount of animal feed or the calculated partial amount of animal feed is below a predetermined amount of animal feed at said position along the feeding table.

The above mentioned object is also achieved by a feed pusher for animal feed. The feed pusher comprises a rotatable screw and an electric motor arranged to drive the rotatable screw, wherein the feed pusher is arranged to be operable to travel on a feeding table along a longitudinal axis of the feeding table at a distance from a feeding table edge and to push animal feed sidewards in relation to the longitudinal axis towards the feeding table edge by a rotational movement of the rotatable screw, wherein the feed pusher comprises a sensor configured to obtain a value of a parameter related to the electric motor during a time period of operation of the feed pusher, wherein the sensor is arranged to communicate with a processing unit configured to estimate an amount of animal feed that has been pushed during the time period based on the obtained value of the parameter.

The operation of the electric motor can be described by a parameter related to the electric motor. Thus, by obtaining a value of a parameter related to the electric motor the conditions of the electric motor can be monitored. The rotatable screw, driven by the electric motor, generates some braking forces on the electric motor. However, the braking forces are mostly related to the amount of animal feed that is pushed by the rotatable screw. The braking forces increase when the pushed amount of animal feed increases, and the braking forces decrease when the pushed amount of animal feed decreases. Thereby, the value of the parameter related to the electric motor is correlated with the amount of animal feed that is pushed by the rotatable screw. Consequently, the amount of animal feed that has been pushed during a time period can be estimated based on the obtained value of the parameter during the time period.

Obtaining the value of the parameter related to the electric motor can be achieved in a simple manner by using a measuring device configured to measure the parameter. Thus, the amount of the animal feed that has been pushed during the time period can be estimated in a simple and reliable manner without need of a complicate equipment. Thereby the above mentioned object is achieved.

The feed pusher provides advantages corresponding to the advantages of the method described above.

According to an embodiment the processing unit is configured to predict the remaining amount of animal feed on the feeding table along at least a part of the length of the feeding table based on the estimated amount of animal feed that has been pushed during the time period. Thereby, information about the estimated amount of animal feed that has been pushed during the time period can be used to predict, i.e. to forecast the amount of animal feed ahead of the feed pusher along at least the part of the length of the feeding table.

According to an embodiment the processing unit is configured to predict the total amount of animal feed on the entire feeding table based on the estimated amount of animal feed and based on the distance from the feeding table edge.

The estimated amount of animal feed that has been pushed during the time period at a predetermined distance from the feeding table edge compared with a predetermined amount of animal feed at said predetermined distance from the feeding table edge can indicate the total amount of animal feed remaining on the entire feeding table. The prediction about the total amount of animal feed remaining on the entire feeding table can be done when the predetermined distance is an outermost distance or when the predetermined distance is a distance closest to the feeding table edge.

An estimated amount of animal feed, which has been pushed during the time period, that is equal or above a first predetermined amount of animal feed at a first predetermined distance from the feeding table edge, can indicate a first total amount of animal feed remaining on the entire feeding table. For example, when the first predetermined distance is an outermost distance from the feeding table edge and when the first predetermined amount of animal feed has been set to a relatively large amount of animal feed, then the conclusion will be that the first total amount of animal feed on the entire feeding table is a relative large amount of animal feed remaining on the entire feeding table. The relative large amount of animal feed may mean that there is enough of animal feed on the entire feeding table for feeding animals.

In a similar way, the estimated amount of animal feed, that has been pushed during the time period, which is equal to or falls below a second predetermined amount of animal feed at a second predetermined distance from the feeding table edge, indicates a second total amount of animal feed remaining on the entire feeding table. Thus, when the second predetermined distance is a distance closest to the feeding table edge and when the second predetermined amount of animal feed has been set to a relatively low amount of animal feed, then the conclusion may be that the second total amount of animal feed remaining on the entire feeding table is a relatively low amount of animal feed on the entire feeding table. A detected low amount of animal feed close to the feeding table edge may mean that most of the animal feed has been eaten, and may advantageously be used as a trigger for preparing and/or providing new feed.

According to an embodiment the parameter is correlated with the load of the electric motor. The load of the electric motor can be monitored by means of a sensor that may be arranged at the electric motor. Thus, the value of the parameter can be obtained in a reliable and efficient manner without need of equipment that stands out from the feed pusher.

According to an embodiment the parameter is correlated with the electric current through the electric motor. Measuring of an electric current through the electric motor gives information about how much energy the electric motor is using during operation of the feed pusher. Thus, the value of the parameter can be obtained in a reliable and efficient manner simply by monitoring the electric current through the electric motor.

According to an embodiment the feed pusher comprises a measuring unit configured to measure a travel distance the feed pusher has been traveled along the longitudinal axis of the feeding table. Thereby, also the travel distance can be used as a variable when estimating an amount of animal feed on the feeding table. Thereby, an improved method for estimating an amount of animal feed on a feeding table can be provided.

According to an embodiment the processing unit is configured to calculate a partial amount of animal feed present along the measured travel distance based on the estimated amount of animal feed that has been pushed during the time period and based on the measured travel distance. Thus, the partial amount of the total amount of animal feed along the feeding table can be calculated based on the estimated amount of animal feed and based on the measured travel distance, namely the amount present along the measured travel distance.

According to an embodiment the processing unit is configured to predict a remaining amount of animal feed present on the remaining length of the feeding table ahead of the measured travel distance, based on the calculated partial amount of animal feed. The calculated partial amount of animal feed may be used to forecast the remaining amount of animal feed ahead of the measured travel distance. For example, it may be predicted that the remaining amount of animal feed ahead of the measured travel distance is the same as the calculated partial amount of animal feed. As a result, a yet improved method related to the operation of a feed pusher can be provided where also the remaining amount of animal feed present on the remaining length of the feeding table ahead of the measured travel distance can be predicted.

According to an embodiment the processing unit is configured to generate or to update a function representing the current amount of animal feed present on the feeding table based on at least one of the estimated amount of animal feed, the predicted remaining amount of animal feed, the predicted total amount of animal feed or the calculated partial amount of animal feed. The function representing the current amount of animal feed present on the feeding table may be used for visualization of the current amount of animal feed and/or for making decisions regarding feeding. The further processing and analysis may, for example, imply generating a map or a chart of the current amount of animal feed. Thus, making decisions regarding the feeding may be facilitated thanks to the generated function.

According to an embodiment the feed pusher is configured to provide an information to an entity about the function. Thus, the information about the generated function can be provided to the entity, for example can be sent to the entity for further processing of the information about the function. The information can be sent through a wire or in a wireless manner. Thereby, the entity may be arranged at the feed pusher or the entity may be arranged at a distance from the feed pusher.

According to an embodiment the processing unit is configured to trigger the displaying on a user interface of a visual representation of the function. The visual representation of the function facilitates the understanding of the information for a user. Displaying the visual representation of the function on the user interface makes it easier for the user to interpret the information which improves the process of drawing the conclusions regarding an amount of animal feed on the feeding table and thus also regarding which actions, if any, that are to be taken.

According to an embodiment the feed pusher is configured to trigger the sending of a message to an animal feed preparation and/or distribution apparatus when at least one of the estimated amount of animal feed, the predicted remaining amount of animal feed, the predicted total amount of animal feed or the calculated partial amount of animal feed is below a predetermined value of animal feed and when the distance is equal or shorter than a predetermined distance from the feeding table edge.

For example, the predetermined distance may be the distance closest to the feeding table edge. Thus, when the predicted total amount of animal feed is below a predetermined value of animal feed and when the distance is the distance closest to the feeding table edge the conclusion will be that animal feed has been eaten on the entire feeding table and a refill of the animal feed along the entire feeding table may be needed.

In a similar way, a conclusion about refill of the animal feed at a position along the feeding table, may be drown, when at least one of the estimated amount of animal feed, the predicted remaining amount of animal feed or the calculated partial amount of animal feed is below a predetermined amount of animal feed at said position along the feeding table.

BRIEF DESCRIPTION OF THE DRAWINGS

In the following preferred embodiments of the invention are described with reference to the attached drawings, on which.

DETAILED DESCRIPTION OF PREFERRED EMBODIMENTS OF THE INVENTION

Figure 1:
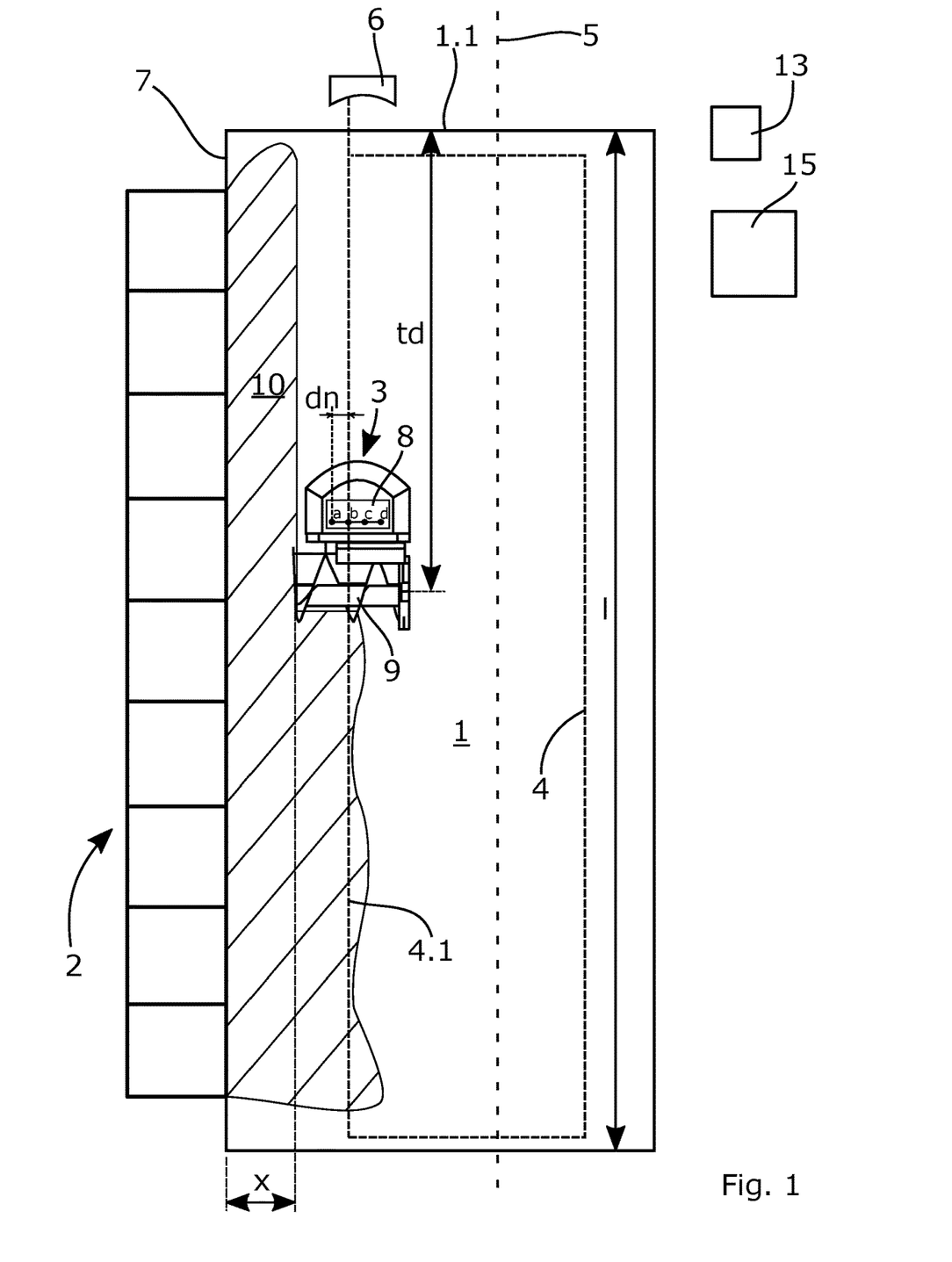
FIG. 1 is a schematic illustration of a feeding table and a feed pusher being operating on the feeding table.

In FIG. 1 a feeding table 1 and a feed pusher 3 operating on the feeding table 1 are illustrated in a schematic manner. The feeding table 1 may be a part of a floor in a cowshed. The feeding table 1 may have different forms, for example, a form of a rectangle or a square or an "L", or "T". The feed pusher 3 being arranged to travel along a longitudinal axis 5 of the feeding table 1 at a distance x from a feeding table edge 7. The feeding table edge 7 defines the edge and the side of the feeding table 1 at which animals are eating. The position of animals at the feeding table 1 has been illustrated by a row of squares 2, where each square represents the position of one animal at the feeding table 1.

The feeding table 1 comprises an electrically conductive wire 4 arranged to enable traveling of the feed pusher 3 along the feed table 1. The electrically conductive wire 4 may be arranged as a loop integrated in the feeding table 1, this embodiment is illustrated in FIG. 1. As an alternative a part of the wire 4 may be arranged in the feeding table 1 while the remaining part may be hanging above the feeding table 1.

According to the embodiment in FIG. 1, part 4.1 of the wire 4 is arranged along the longitudinal axis 5 to enable the feed pusher 3 to travel/operate on the feeding table 1 along a path parallel to the longitudinal axis 5 and parallel to the feeding table edge 7. The wire 4 may be molded in the feeding table 1. The wire 4 is provided with electricity by a control unit 6, which control unit 6 works also as a charging station for the feed pusher 3. However, it should be noted that other means for guiding the feed pusher 3 along the feed table 1 than a continuous conductive wire are possible.

The feed pusher 3 comprises a positioning unit 8 configured to position the feed pusher in relation the feeding table edge 7. In the embodiment disclosed, the position unit 8 comprises, four nodes: a, b, c and d. The nodes a, b, c and d may be arranged along a straight line at a distance dn from each other. For simplicity only the distance dn between the node a and the node b has been illustrated. However, the distances between the others nodes may be equal the distance dn between the node a and the node b. The distances between the nodes may also be different. Thus, for example the distance between the node a and the node b may be different than the distance between the node b and the node c. The distances between the nodes a, b, c and d define the distance x between the feed pusher 3 and the feeding table edge 7. The distance x to the feeding table edge 7 may, for example, be 111 cm, 99 cm, 87 cm and 75 cm corresponding to the nodes a, b, c and d respectively.

The positioning unit 8 is arranged to communicate with, or sense, the wire 4 to guide the feed pusher 3 along the wire 4 through the nodes a, b, c or d. As described above, the distance x to the feeding table edge 7 is controlled by the nodes a, b, c or d, which nodes are activated one at a time to decide the distance x to the feeding table edge 7. The activated node communicates with the wire 4 such that the activated node follows the wire 4. Thus, by activating one of the nodes a, b, c or d the feed pusher can change its position and thereby change the distance x to the feeding table edge 7. Thus, in this example, activation of node d entails that the feed pusher 3 runs along the wire 4.1 in a position closest to the feed table edge 7, while activation of node a entails that the feed pusher 3 runs along the wire 4.1 in a position furthest away from the feed table edge 7. The nodes may be implemented by sensors, which, when activated, can sense the wire 4 and thus navigate the feed pusher to locate the activated sensor immediately above the wire 4 (e.g. such that it senses the wire 4 as strong as possible).

In FIG. 1, the feed pusher 3 is illustrated traveling at a distance x defined by node b. According to the embodiments in FIG. 1, the node d defines the shortest possible distance x to the feeding table edge 7, while the node a defines the longest possible distance x to the feeding table edge 7. The feed pusher 3 can shift between the nodes a, b, c and d during operation of the feed pusher 3, i.e. during traveling along the longitudinal axis 5. Which node is activated may, for example, depend on the amount of animal feed 10 ahead of the feed pusher 3.

Activating and deactivating of the nodes and thereby changing the distance x to the feeding table edge may be done automatically be means of a software installed in the feed pusher 3, which may select a suitable distance x based e.g. on the load of the motor running the feed pusher 3.

Figure 2:
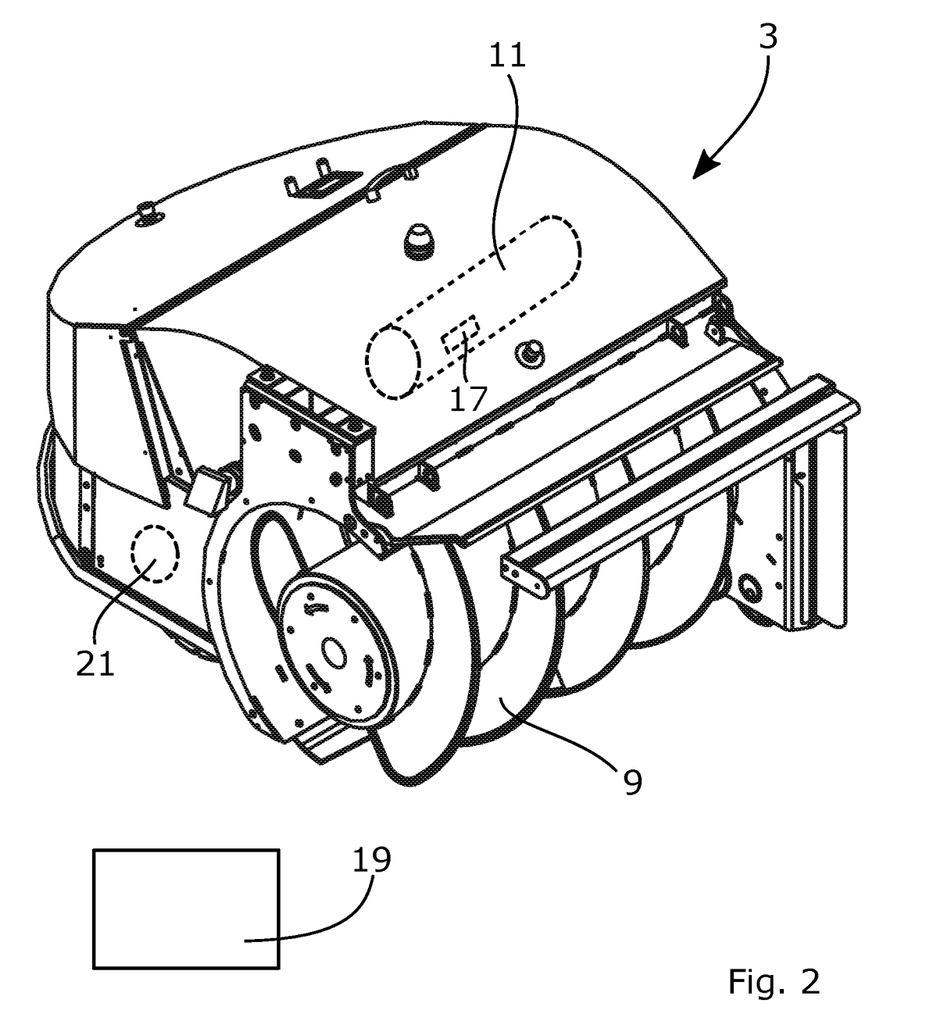
FIG. 2 is a perspective view of a feed pusher and FIG. 3.1 and FIG. 3.2 are examples of functions representing the current amount of animal feed on a feeding table.

The feed pusher 3 is arranged to push the animal feed 10 sidewards in relation to the longitudinal axis 5 towards the feeding table edge 7 by a rotational movement of a rotatable screw 9 driven by an electric motor. The electric motor is illustrated in FIG. 2. Thus, from the perspective of the feed pusher the animal feed 10 is pushed to the right in FIG. 2. The rotatable screw 9 used for pushing the animal feed 10 has an advantage of eliminating a compression of the animal feed, which is the case of other automated systems on the market. Further, by rotatable screw 9 pushing and mixing of the animal feed is achieved, which makes the feed more appealing for the animals.

The rotatable screw 9 driven by the electric motor generates a braking force on the electric motor due to the inertia of the rotatable screw 9. However, the braking force is mostly related to the amount of animal feed 10 that is been pushed by the rotatable screw 9. Thus, the braking force increases when the amount of the animal feed 10 increases and the braking force decreases when the amount of animal feed decreases. Thereby, by obtaining a value of a parameter related to the electric motor during a time period of operation of the feed pusher 3 the amount of animal feed that has been pushed during the time period, at the distance x, can be estimated based on the obtained value of the parameter. The time period may for example be 3, 5 or 9 seconds. The value of the parameter related to the electric motor may be obtained during one time period or during several time periods. Thus, the amount of animal feed that has been pushed during the time period may be estimated based on the obtained value of the parameter from one or several time periods.

The feeding table 1 has a length l. The amount of animal feed 10 may also be estimated along at least a part of the length l of the feeding table 1 based on the estimated amount of animal feed that has been pushed during the time period. Thus, the estimated amount of animal feed pushed during the time period can be used to estimate, i.e. to predict the amount of animal feed ahead of the feed pusher along at least the part of the length of the feeding table. The simplest algorithm would be to extrapolate an estimated amount of feed along the whole or part of the length l of the feed table 1, e.g. assuming a distance traversed during the time period. Another possibility could be to locate indictors, e.g. beacons, transceivers or magnets, at the start and end of at least one eating place (boxes 2 in FIG. 1) and estimating the amount of feed pushed from the receiving of a signal from the first beacon until receiving a signal from the second beacon and extrapolating this estimated amount over an optional number of animal eating places.

The parameter may correlate with the load of the electric motor or the parameter may correlate with the electric current through the electric motor. Thus, for example, a hall effect-based linear current sensor (not shown) may be used for measuring the ampere level through the electric motor. The measured ampere level is then compared with the nominal ampere level of the electric motor. The load of the electric motor may be calculated based on the ampere level. The ampere level at the nominal value implies no increase of load of the electric motor, which may mean that the amount of animal feed on the feeding table is zero or is a relatively low amount of animal feed. An increase of the ampere level implies an increase of the amount of the animal feed that has been pushed. The amount of animal feed may, for example, be proportional to the ampere level with a correlation, for example, 100 kg animal feed corresponds to an increase of the ampere level with 5 A. The correlation between the amount of animal feed in kilograms and the ampere level may depend on the kind of animal feed. Thus, animal feed with a higher moisture level causes a larger increase of the friction forces on the electric motor comparing to an animal feed with a lower moisture level.

Further, also the total amount of animal feed on the entire feeding table 1 can be predicted based on the estimated amount of animal feed that has been pushed during the time period and based on the distance x from the feeding table edge 7. As described above the distance x depends on which node of the nodes a, b, c or d that is activated. Thus, when the feed pusher 3 operates at a distance x defined by the node a and the estimated amount of animal feed, that has been pushed during the time period, is equal or above a first predetermined amount of animal feed, the conclusion will be that there is enough animal feed 10 on the entire feeding table 1. The first predetermined amount of animal feed may be set to be slightly below the amount of fresh and new animal feed that has been dispensed onto the feeding table before animals have started eating.

In a similar way, when the feed pusher 3 operates at a distance x defined by the node d and the estimated amount of animal feed, that has been pushed during the time period, is equal or below a second predetermined amount of animal feed, the conclusion will be that there is little of the animal feed 10 left on the entire feeding table 1. The second predetermined amount of animal feed may be set to be slightly above zero.

As illustrated in FIG. 1 the feed pusher 3 has been traveled a traveling distance td. The traveling distance td may be measured from a side edge 1.1 of the feeding table 1 or from a position at the feeding table in line with the start of an animal eating place (illustrated by squares 2). The traveling distance td can be obtained, for example by a hall sensor mounded at a wheel of the feed pusher 3. Knowing the width of an animal eating place 2 enables use of an estimated traveling distance corresponding to this width of an animal eating place rather than relying on beacons or similar, as previously described.

The feed pusher 3 pushes the animal feed 10 while traveling along the longitudinal axis 5. As illustrated in FIG. 1 the animal feed 10 has been pushed towards the feeding table edge 7 along the traveling distance td.

Knowing the traveling distance td also a partial amount of animal feed on the feeding table 1 along the measured travel distance td may be calculated based on the estimated amount of animal feed that has been pushed during the time period and based on the measured travel distance td. The partial amount of animal feed may be calculated by multiplying the estimated amount with the measured travel distance.

Figure 31:
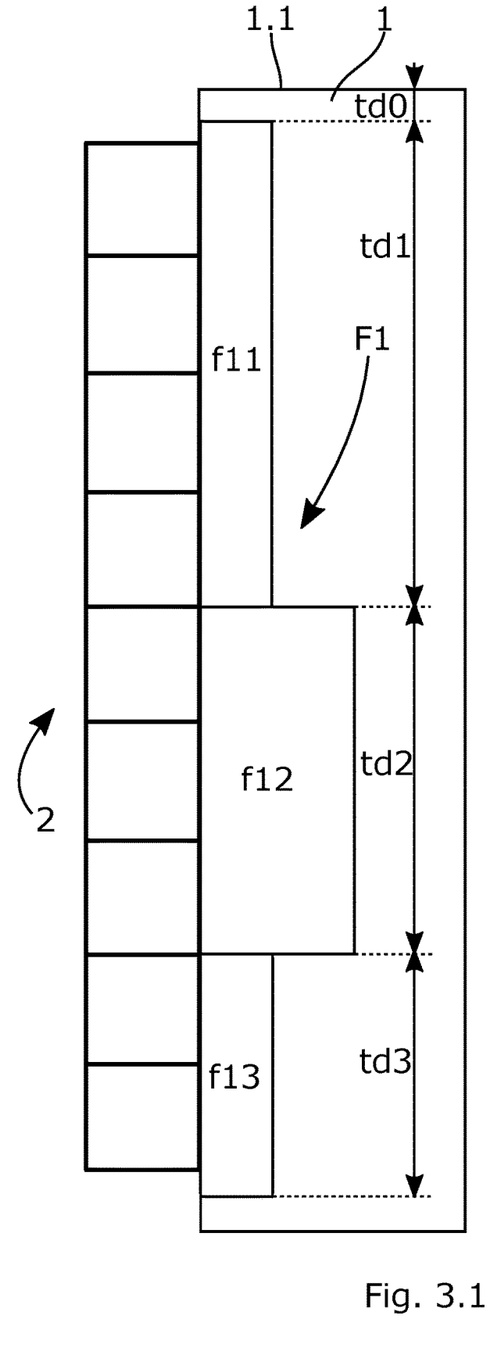
Figure 32:
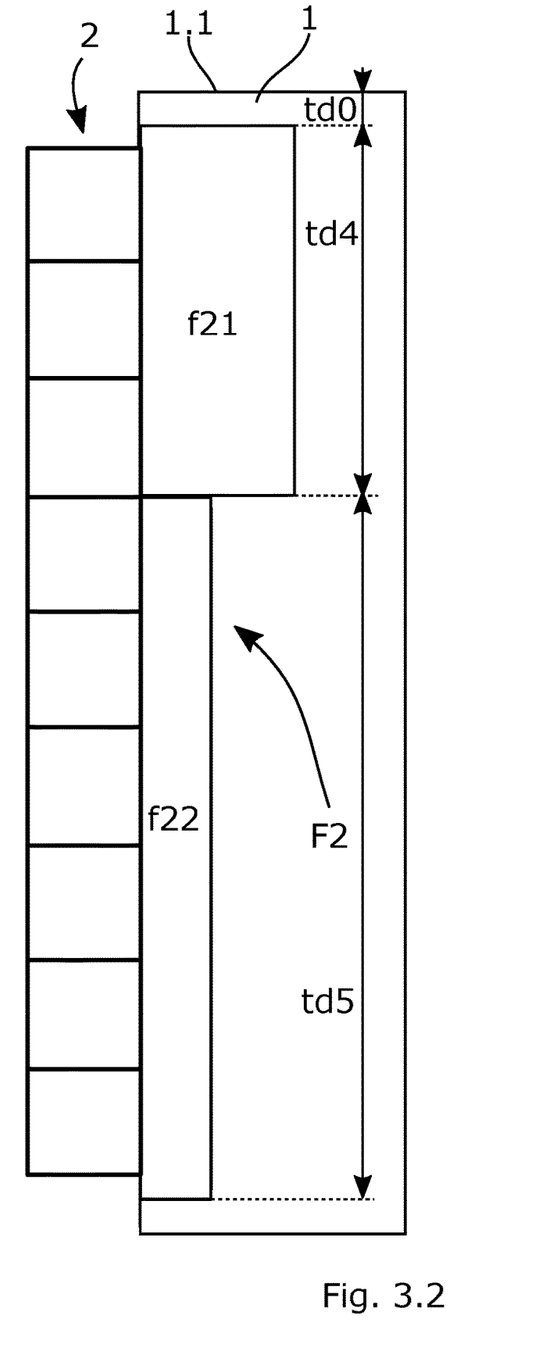

In FIG. 1 also an entity 13 and a feed preparation and/or distribution apparatus 15 are illustrated. The entity 13 may be arranged to receive an information about a function, shown in FIG. 3, representing the current amount of animal feed present along at least a part of the feeding table 1. The function may be based of the calculated partial amount of animal feed described above. The function may also be based on a predicted remaining amount of animal feed present on the remaining length of the feeding table ahead of the measured travel distance, which predicted remaining amount of animal feed may be based on the calculated partial amount of animal feed.

The animal feed preparation and/or distribution apparatus 15, for example an autonomous mixer wagon, or feed distribution vehicle, is arranged to receive a message indicating for example, that the estimated total amount of animal feed is below a predetermined value of animal feed. In such a case, the message may indicate that a new set of animal feed needs to be prepared and/or distributed on the feeding table 1.

In FIG. 2 the feed pusher 3 shown in FIG. 1 is illustrated in a perspective view. The feed pusher 3 comprises an electric motor 11 arranged to drive a rotatable screw 9. The feed pusher 3 comprises a sensor 17 configured to obtain a value of a parameter related to the electric motor 11. The parameter may be correlated with the load of the electric motor 11 or the parameter may be correlated with the electric current through the electric motor 11. As an example a hall effect-based linear current sensor may be used.

The sensor 17 may be arranged at the electric motor 11 or the sensor 17 may be arranged at a power cable (not shown) providing the electric motor 11 with electric current. The sensor 17 is arranged to communicate with a processing unit 19 configured to estimate an amount of animal feed that has been pushed during a time period at a distance from a feeding table edge based on the obtained value of the parameter.

According to an embodiment the processing unit 19 may be arranged at the feed pusher 3, i.e. the processing unit 19 may be integrated with the feed pusher 3 by being mounted within a casing of the feed pusher 3. As an alternative, the processing unit 19 may also be arranged at a distance from the feed pusher 3. In such a case, the processing unit 19 is arranged to receive signals from the sensor 17, for example, through a wireless communication system.

The processing unit 19 is configured to estimate an amount of animal feed that has been pushed during a time period at a distance from a feeding table edge as it has been described in conjunction to FIG. 1.

A measuring device 21 is provided at the feed pusher 3 to measure a travel distance td the feed pusher 3 has been traveled along the longitudinal axis 5 of the feeding table 1.

In FIG. 3.1 the current amount of animal feed according to a function F1 is illustrated. The function F1 is an example of a distribution of the animal feed on the feeding table 1. The function F1 may also be called a map. The function F1 may comprise a first sub-function f11, a second sub-function f12 and a third sub-function f13. The sub-functions f11, f12 and f13 represent the amount of the animal feed along a first travel distance td1, a second travel distance td2 and a third travel distance td3 respectively. The travel distances td1, td2 and td3 represent travel distances of the feed pusher along the longitudinal axis of the feeding table as described in conjunction to FIG. 1. The travel distances td1, td2 and td3 represent travel distances of the feed pusher along the longitudinal axis of the feeding table where presence of animal feed has been detected and where an amount of animal feed has been estimated. At an initial travel distance td0 measured from the side edge 1.1 of the feeding table 1 the amount of animal feed has been estimated to zero.

The first sub-function f11 is provided based on an obtained value of a parameter related to the electric motor of the feed pusher during an initial time period of operation of the feed pusher on the feeding table 1. When the first sub-function f11 has been obtained, the feed pusher switches its position to an outer node, i.e. the distance to the feeding table edge is increased. The feed pusher continues then to travel along the feeding table 1 along a path defined by the outer node until a new amount of the animal feed is estimated or until a predetermined time period has expired. The new amount of animal feed is larger than the amount of animal feed described by the first sub-function f11.

When the predetermined time period has expired the feed pusher switches back to the previous node and thereby to the previous path, defined by the previous node, closer to the feeding table edge. The feed pusher switches back to the previous node in order to control if the amount of animal feed is less comparing to the animal feed described by the first sub-function f11. If the amount of the animal feed is substantially unchanged, the feed pusher switches again to the outer node. Thereafter, the feed pusher continues to travel along the feeding table 1 along a path defined by the outer node until a new amount of the animal feed is estimated or until a new predetermined time period has expired and the procedure is repeated. The second sub-function f12 illustrates the case when the new amount of the animal feed has been estimated. The new amount of animal feed described by the second sub-function f12 is larger comparing to the amount of animal feed described by the first sub-function f11.

The procedure of estimating the new amount of animal feed is repeated as described above. As illustrated in FIG. 3.1 an amount of animal feed described by the third function f13 has been estimated along the third travel distance td3. The amount of animal feed described by the third sub-function f13 is less than the amount of animal feed described by the second sub-function f12.

Consequently, a map of the current amount of animal feed present along at least a part of the feeding table may be achieved by estimating the amount of animal feed and by generating respective sub-functions representing the estimated amount of animal feed.

The map of the current amount of animal feed describes how much animal feed is present at different parts of the feeding table. A visual representation of function F1 may be displayed on a user interface, which user interface may be a computer or a phone. The sub-functions f11, f12 and f13 may be illustrated by using different colors for each sub-function. Thereby, work with preparation of animal feed can be facilitated for a farmer who will get an information about the current amount of animal feed on the feeding table.

FIG. 3.2 illustrates the current amount of animal feed according to another embodiment which can be illustrated by another function F2. The another function F2 can be achieved in a similar way as the function F1 described above and the process of generating of the another function F2 is therefore not described in detail herein. As can be seen the another function F2 comprises a fourth sub-function f21 and a fifth sub-function f22. The sub-functions f21 and f22 has been estimated along the fourth travel distance td4 and along a fifth travel distance td5 respectively.

Similarly to the FIG. 3.1, the travel distances td4 and td5 represent travel distances of the feed pusher along the longitudinal axis of the feeding table where presence of animal feed has been detected and where an amount of animal feed has been estimated. At an initial travel distance td0 measured from the side edge 1.1 of the feeding table 1 the amount of animal feed has been estimated to zero.

The feed pusher may be controlled to travel along the outline of the animal feed 10 placed on the feeding table 1 by changing between the nodes a, b, c and d described above based on the value of the parameter, e.g. such that the parameter lies within a predefined range. Thereby, the functions or maps illustrated in FIG. 3.1 and in FIG. 3.2 may be achieved by means of the feed pusher following the outline of the animal feed present on the feeding table 1.

The present invention is no limited to the embodiments disclosed but may be varied and modified within the scope of the following claims.

The invention claimed is:

1. A method for operating a feed pusher configured to travel on a feeding table along a longitudinal axis of the feeding table at a distance from a feeding table edge and configured to push animal feed, placed on the feeding table, sidewards in relation to the longitudinal axis towards the feeding table edge by a rotational movement of a rotatable screw driven by an electric motor, the method comprising:
    obtaining a value of a parameter related to braking forces generated on said electric motor driving said rotatable screw during a time period of said operation of the feed pusher traveling on the feeding table with said rotatable screw pushing the animal feed sidewards in relation to the longitudinal axis towards the feeding table edge, wherein the braking forces increase when a pushed amount of animal feed increases, and the braking forces decrease when the pushed amount of animal feed decreases and the braking forces relate to the amount of animal feed that is pushed by the rotatable screw;
    estimating the amount of animal feed that has been pushed during said time period based on the obtained value of the parameter;
    measuring a travel distance the feed pusher has traveled along said longitudinal axis of the feeding table during said time period; and
    calculating a partial amount of animal feed present along said measured travel distance based on the estimated amount of animal feed that has been pushed during said time period and said measured travel distance.

2. The method according to claim 1, further comprising: predicting a remaining amount of animal feed on the feeding table along at least a part of the length of the feeding table based on the estimated amount of animal feed that has been pushed during said time period.

3. The method according to claim 1, further comprising: predicting a total amount of animal feed remaining on the entire feeding table based on the estimated amount of animal feed and said distance from the feeding table edge.

4. The method according to claim 1, wherein said parameter is correlated with a load of the electric motor.

5. The method according to claim 1, wherein said parameter is correlated with an electric current through the electric motor.

6. The method according to claim 1, further comprising: predicting a remaining amount of animal feed present on a remaining length of the feeding table ahead of the measured travel distance, based on the calculated partial amount of animal feed.

7. The method according to claim 1, further comprising: generating or updating a function representing a current amount of animal feed present on the feeding table based on at least one of: (i) the estimated amount of animal feed, (ii) a predicted remaining amount of animal feed, (iii) a predicted total amount of animal feed, and (iv) a calculated partial amount of animal feed.

8. The method according to claim 7, further comprising: triggering providing information to an entity about said function.

9. The method according to claim 7, further comprising: triggering displaying a visual representation of the function on a user interface.

10. The method according to claim 1, further comprising: triggering sending a message to an animal feed preparation and/or distribution apparatus when at least one of: (i) the estimated amount of animal feed, (ii) a predicted remaining amount of animal feed, (iii) a predicted total amount of animal feed, and (iv) a calculated partial amount of animal feed is below a predetermined value of animal feed and when said distance is equal to or shorter than a predetermined distance from the feeding table edge.

11. A feed pusher for animal feed, the feed pusher comprising:
    a rotatable screw;
    an electric motor configured to drive the rotatable screw;
    a sensor;
    a processor,
    wherein the feed pusher is configured to travel on a feeding table along a longitudinal axis of the feeding table at a distance from a feeding table edge and configured, by a rotational movement of the rotatable screw being driven by the electric motor, to have the rotatable screw push animal feed sidewards in relation to the longitudinal axis towards said feeding table edge by a rotational movement of the rotatable screw,
    wherein the sensor is configured to obtain a value of a parameter related to braking forces generated on said electric motor driving said rotatable screw during a time period of operation of said feed pusher traveling on the feeding table with said rotatable screw pushing the animal feed sidewards in relation to the longitudinal axis towards the feeding table edge, wherein the braking forces increase when a pushed amount of animal feed increases, and the braking forces decrease when the pushed amount of animal feed decreases and the braking forces relate to the amount of animal feed that is pushed by the rotatable screw, said sensor being configured to communicate with the processor, the processor being configured to estimate an amount of animal feed that has been pushed during said time period based on the obtained value of the parameter; and a measurement device configured to measure a travel distance the feed pusher has traveled along said longitudinal axis of the feeding table during said time period, wherein the processor is configured to calculate a partial amount of animal feed present along said measured travel distance based on the estimated amount of animal feed that has been pushed during said time period and said measured travel distance.

12. The feed pusher according to claim 11, wherein the processor is configured to predict a remaining amount of animal feed on the feeding table along at least a part of the length of the feeding table based on the estimated amount of animal feed that has been pushed during said time period.

13. The feed pusher according to claim 11, wherein the processor is configured to predict a total amount of animal feed on the entire feeding table based on the estimated amount of animal feed and said distance from the feeding table edge.

14. The feed pusher according to claim 11, wherein said parameter is correlated with a load of the electric motor.

15. The feed pusher according to claim 11, wherein said parameter is correlated with an electric current through the electric motor.

16. The feed pusher according to claim 11, wherein the processor is configured to predict a remaining amount of animal feed present on a remaining length of the feeding table ahead of the measured travel distance, based on the calculated partial amount of animal feed.

17. The feed pusher according to claim 11, wherein the processor is configured to generate or to update a function representing a current amount of animal feed present on the feeding table based on at least one of: (i) the estimated amount of animal feed, (ii) a predicted remaining amount of animal feed, (iii) a predicted total amount of animal feed, and (iv) a calculated partial amount of animal feed.

18. The feed pusher according to claim 17, wherein the feed pusher is configured to provide information to an entity about said function.

19. The feed pusher according to claim 17, wherein the processor is configured to trigger displaying a visual representation of the function on a user interface.

20. The feed pusher according to claim 11, wherein the feed pusher is configured to trigger sending a message to an animal feed preparation and/or distribution apparatus when at least one of: (i) the estimated amount of animal feed, (ii) a predicted remaining amount of animal feed, (iii) a predicted total amount of animal feed, and (iv) a calculated partial amount of animal feed is below a predetermined value of animal feed and when said distance is equal to or shorter than a predetermined distance from the feeding table edge.

* * * * *